(12) United States Patent
Pidduck

(10) Patent No.: US 9,355,131 B2
(45) Date of Patent: May 31, 2016

(54) SYSTEM AND METHOD FOR DOCUMENT VERSION CURATION WITH REDUCED STORAGE REQUIREMENTS

(71) Applicant: Open Text S.A., Luxembourg (LU)

(72) Inventor: Patrick Sidney Thomas Pidduck, Waterloo (CA)

(73) Assignee: Open Text S.A., Luxembourg (LU)

( * ) Notice: Subject to any disclaimer, the term of this patent is extended or adjusted under 35 U.S.C. 154(b) by 215 days.

(21) Appl. No.: 14/041,226

(22) Filed: Sep. 30, 2013

(65) Prior Publication Data

US 2014/0095456 A1   Apr. 3, 2014

Related U.S. Application Data

(60) Provisional application No. 61/708,472, filed on Oct. 1, 2012.

(51) Int. Cl.
*G06F 17/00* (2006.01)
*G06F 7/00* (2006.01)
*G06F 17/30* (2006.01)

(52) U.S. Cl.
CPC .................. *G06F 17/30309* (2013.01)

(58) Field of Classification Search
CPC .................................. G06F 17/30309
USPC .................................................. 707/695
See application file for complete search history.

(56) References Cited

U.S. PATENT DOCUMENTS

| | | | | | |
|---|---|---|---|---|---|
| 5,649,200 | A * | 7/1997 | Leblang | G06F 8/71 | 707/999.202 |
| 5,806,078 | A * | 9/1998 | Hug | G06F 17/2288 | 707/999.202 |
| 5,819,295 | A * | 10/1998 | Nakagawa | G06F 17/30011 | 707/999.203 |
| 6,125,371 | A * | 9/2000 | Bohannon | G06F 17/30309 | 707/695 |
| 6,185,734 | B1 * | 2/2001 | Saboff | G06F 8/67 | 707/999.202 |
| 6,377,960 | B1 * | 4/2002 | Qiu | G06F 17/30309 | 707/999.2 |
| 6,405,223 | B1 * | 6/2002 | Kelley | G06F 17/30893 | 707/999.202 |
| 6,493,709 | B1 * | 12/2002 | Aiken | G06F 17/2211 | 704/2 |
| 7,617,226 | B1 * | 11/2009 | Burrows | G06F 17/30067 | 707/999.1 |
| 8,831,409 | B1 * | 9/2014 | Chang | H04N 21/4516 | 386/292 |
| 2002/0073110 | A1 * | 6/2002 | Duvillier | G06F 9/4435 | 707/999.206 |
| 2002/0156798 | A1 * | 10/2002 | Larue | G06F 17/30575 | 707/999.201 |
| 2004/0126750 | A1 * | 7/2004 | Theilmann | G09B 7/00 | 434/362 |
| 2005/0004887 | A1 * | 1/2005 | Igakura | H04L 67/327 | 707/999.001 |
| 2005/0027758 | A1 * | 2/2005 | Meller | G06F 8/68 | 707/999.204 |
| 2005/0076066 | A1 * | 4/2005 | Stakutis | G06F 17/30067 | 707/999.2 |
| 2005/0080497 | A1 * | 4/2005 | Rao | G11B 27/034 | 700/94 |
| 2006/0224626 | A1 * | 10/2006 | Lakshminath | G06F 17/3023 | 707/999.107 |
| 2006/0236319 | A1 * | 10/2006 | Pinnix | G06F 8/71 | 717/170 |
| 2007/0100950 | A1 * | 5/2007 | Bornstein | G06Q 10/107 | 709/206 |
| 2009/0043774 | A1 * | 2/2009 | Sudhakar | G06F 21/6227 | 707/999.009 |
| 2009/0248757 | A1 * | 10/2009 | Havewala et al. | | 707/203 |
| 2012/0030261 | A1 * | 2/2012 | Mason, Jr. | G06F 17/3023 | 707/822 |

* cited by examiner

*Primary Examiner* — Pavan Mamillapalli
(74) *Attorney, Agent, or Firm* — Sprinkle IP Law Group

(57) ABSTRACT

A system and method for curation of document versions with significantly reduced storage requirements. In some embodiments, all or substantially all versions of a document are at least initially retained. Based on various criteria, versions of the document are selectively deleted while preserving the versions that are likely to provide the highest value. Advantageously, the teachings of embodiments as described can be used in conjunction with various systems, including document versioning, deduplication, and retention systems.

40 Claims, 7 Drawing Sheets

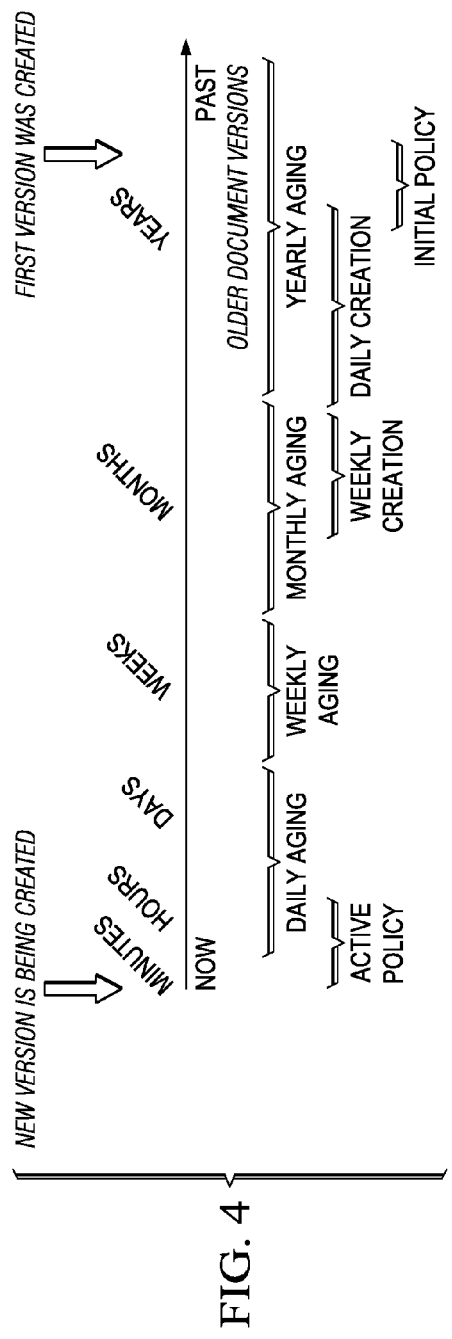
FIG. 4
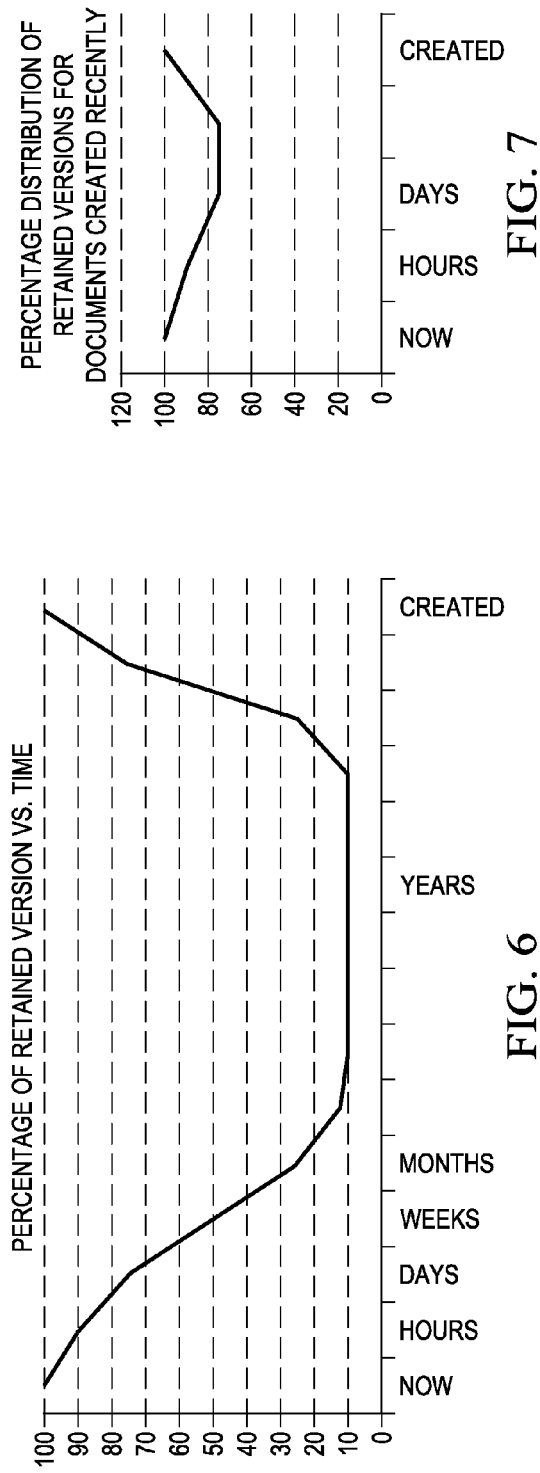
FIG. 7
FIG. 6

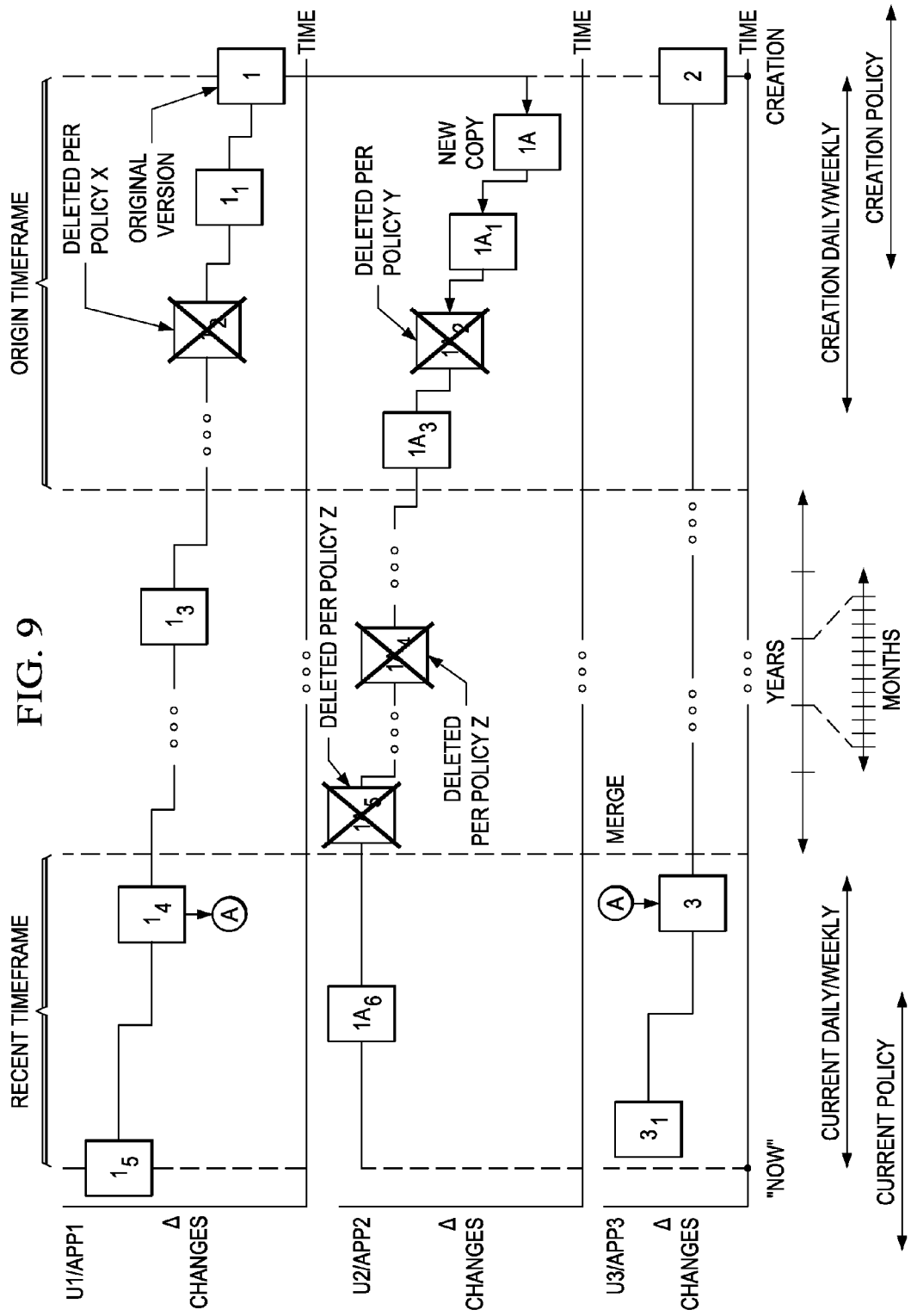

SYSTEM AND METHOD FOR DOCUMENT VERSION CURATION WITH REDUCED STORAGE REQUIREMENTS

CROSS-REFERENCE TO RELATED APPLICATION(S)

This is a conversion of and claims a benefit of priority from U.S. Provisional Application No. 61/708,472, filed Oct. 1, 2012, entitled "SYSTEM AND METHOD FOR DOCUMENT VERSION CURATION WITH REDUCED STORAGE REQUIREMENTS," which is hereby incorporated herein for all purposes.

TECHNICAL FIELD

This disclosure relates generally to the field of information management, and particularly to the field of managing curation and disposal of objects for version control.

BACKGROUND

In a document management system, there is often a need to retain old versions of documents. Consider the case where a document is kept within the document management system, but needs to be modified. The document may be obtained from the document management system, updated, then stored back into the document management system. This new version of the document is now another item to be managed by the document management system.

There are many possible reasons why the new version is separately stored, instead of replacing the previous version. These may include, among other reasons: realizing that an error was made, and restoring to an earlier version; providing a history of changes that allows the process of creating the document to be reviewed; or adhering to policy rules or legal requirements for retaining documents.

Retaining older versions of documents increases the cost of owning a document because each version requires additional storage space. The number of versions of documents that may be created is increasing. This in turn is increasing the cost of operating a document management system.

There are several possible reasons for the increase in the rate of document version creation, and these include:

Strong integration between document authoring and editing software and the document management system. This encourages even "work in progress" documents to be centrally stored in a document management system.

New collaboration software becoming popular. With many people capable of editing the same document in a short period of time, the possible number of versions of a document that are created can increase dramatically.

Both of these scenarios illustrate a common pattern in the lifecycle of a document—rapid changes and many versions occurring in relatively short periods, usually near the start of a document's life.

One approach to limiting space requirements for versions is to not save versions. If a new version of a document is created, it replaces the existing version. This approach does not allow any of the benefits of retaining versions of documents, such as recovery and compliance.

Another solution is to retain a fixed number of versions of a document. For example, if ten versions of a document are to be saved, when version eleven is created then version one is deleted. When version one hundred is created, version ninety is deleted. A variation of this approach is to limit the number of versions by storage space. If the newest version causes the total space used by all versions to exceed an acceptable limit, older versions are deleted until the storage space used is within an acceptable range. While combinations of these solutions will reduce the storage requirements, there is no guarantee that a version of the document that is, e.g., six months old will be available if it is needed.

A more comprehensive approach to managing document versions is often found in Records Management products. Records Management will often incorporate policies and retention schedules. An example view is typically that documents are classified into types. Each type has a policy that dictates how long the document should be kept. Past this date, it is deleted, or subject to other constraints such as legal holds. For example, letters to customers may be kept for seven years, and then deleted. Records Management does not address the storage space versus utility of a version, and when many versions exist in a short time, Records Management policies may not provide any relief for cost of storage.

Another approach that some systems employ uses differences between documents to minimize storage requirements. For example, if a new version contains a change in one sentence, then only this sentence difference is recorded. There are many variations of this approach, but there are weaknesses. Often the difference analysis features must be built into the authoring/editing application, and not all sources of information support this type of capability, which means the solution is only applicable to specific types of documents. A general "binary" difference approach will also have problems if data is encrypted, and if any of the intermediate copies are damaged or lost, one may not be able to restore the older or newer version.

SUMMARY

Embodiments as described provide a new approach to curation of versions of documents. In some embodiments, all or substantially all versions of a document are at least initially retained. Based on various criteria, versions of the document are selectively deleted while preserving the versions that are likely to provide the highest value. Advantageously, the teachings of embodiments as described can be used in conjunction with document versioning, deduplication, and retention systems.

In some aspects, the highest value versions of a document can include: (i) some of the earliest versions, establishing initial timelines and authors and the direction of the document; (ii) some of the most recent versions, needed to restore errors during work in progress and provide review capabilities while the document is being actively developed; and (iii) intermediate versions distributed over time to provide some level of continuity and audit trail.

To this end, in some embodiments, the document version curation approach disclosed herein can preserve the oldest and newest versions, and preserve a sparse collection of versions in between. The overall effect provides a useful collection of versions, while reducing the cost of storage space as compared to a prior approach in which all versions are retained. In some embodiments, document version curation is applied by a version analyzer embodied on a non-transitory computer readable medium in an ongoing fashion. Versions of a document that are retained at a given time may be different than at another time. Those skilled in the art will appreciate that the document version curation approach disclosed herein can be implemented in various ways.

In some embodiment, a method for document version curation may include retaining, in a data storage by the version analyzer, all or substantially all versions of a document created immediately following a creation time of the document and all or substantially all versions of the document created at a given time and immediately preceding the given time. The version analyzer may selectively cull from the data storage based on one or more criteria, at least one version of the document created within a period of time between the creation time of the document and the given time. The one or more criteria may include at least one policy. The version analyzer may determine if and how the at least one policy is to be applied for the selective culling. The version analyzer may keep track of what gets culled by storing information about the at least one version of the document culled from the data storage in a version history database. The selective culling is performed on-demand or at a predefined schedule.

Such a selective culling by the version analyzer can be implemented in many various ways. For example, in one embodiment, the selective culling may include determining a nominal time at which a retained version of the document is not to be culled from the data storage, identifying a last version of the document created in a policy period prior to the nominal time, and culling from the data storage all retained versions of the document created in the policy period except the last version of the document.

Additionally, the one or more criteria driving the selective culling may vary from implementation to implementation. Examples of criteria may include policies governing storage requirement(s), behaviors, timeframes, precedents, prioritization, or a combination thereof. Such policies may be from a configuration file, a database, an application, a backend system, or any appropriate source connected to the version analyzer.

In some embodiment, a method for document version curation may include comparing, by a computer having a processor and a memory, a plurality of versions of a document in a data storage based on a plurality of document version curation policies. A first portion of the plurality of versions of the document may be created within a recent timeframe and a second portion of the plurality of versions of the document, which is different than the first portion of documents, may be created within an origin timeframe corresponding to creation of an original version of the document. The plurality of document version curation policies may include a first document version curation policy related to the first portion of the plurality of versions of the document and a second document version curation policy related to the second portion of the plurality of versions of the document. The first document version curation policy may be executed on the first portion of the versions of the document and the second document version curation policy may be executed on the second portion of the versions of the document.

In one embodiment, the first document version curation policy includes deleting a first percentage of the first portion of the plurality of versions of the document and the second document version curation policy includes deleting a second percentage of the second portion of the plurality of versions of the document. In one embodiment, at least one of the first document version curation policy and the second document version curation policy may be based on comparing the differences between at least two versions of the document. In one embodiment, at least one of the first document version curation policy and the second document version curation policy may be based on a semantic comparison of at least two versions of the document.

In one embodiment, versions of the document created prior to a cutoff date may be deleted. In one embodiment, a group of versions of the document may be deleted. In one embodiment, such a group may be related to a common document version curation policy. Executing the common document version curation policy on one version in the group may cause execution of the common document version curation policy on remaining versions in the group. In one embodiment, such a group may represent different formats of the document. In one embodiment, such a group may represent platform-specific versions of the document. In one embodiment, deletions of the versions of the document may be tracked and at least the first document version curation policy or the second document version curation policy may be modified based on the tracked deletions.

In some embodiments, a system having a processor and a non-transitory computer-readable storage medium such as a memory can be configured to implement a method disclosed herein. In some embodiments, a computer program product may include one or more non-transitory computer-readable storage media storing computer instructions that are executable or translatable by at least one processor to perform a method disclosed herein.

Numerous other embodiments are also possible.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 4 illustrates sample curation policies according to one embodiment.

FIG. 6 depicts a plot diagram illustrating exemplary distribution of percentage of retained documents over time according to one embodiment.

FIG. 7 depicts a plot diagram illustrating exemplary percentage distribution of retained versions for recently created documents according to one embodiment.

FIG. 9 depicts a process flow illustrating an example of a document version curation method according to one embodiment.

DETAILED DESCRIPTION

Figure 1:
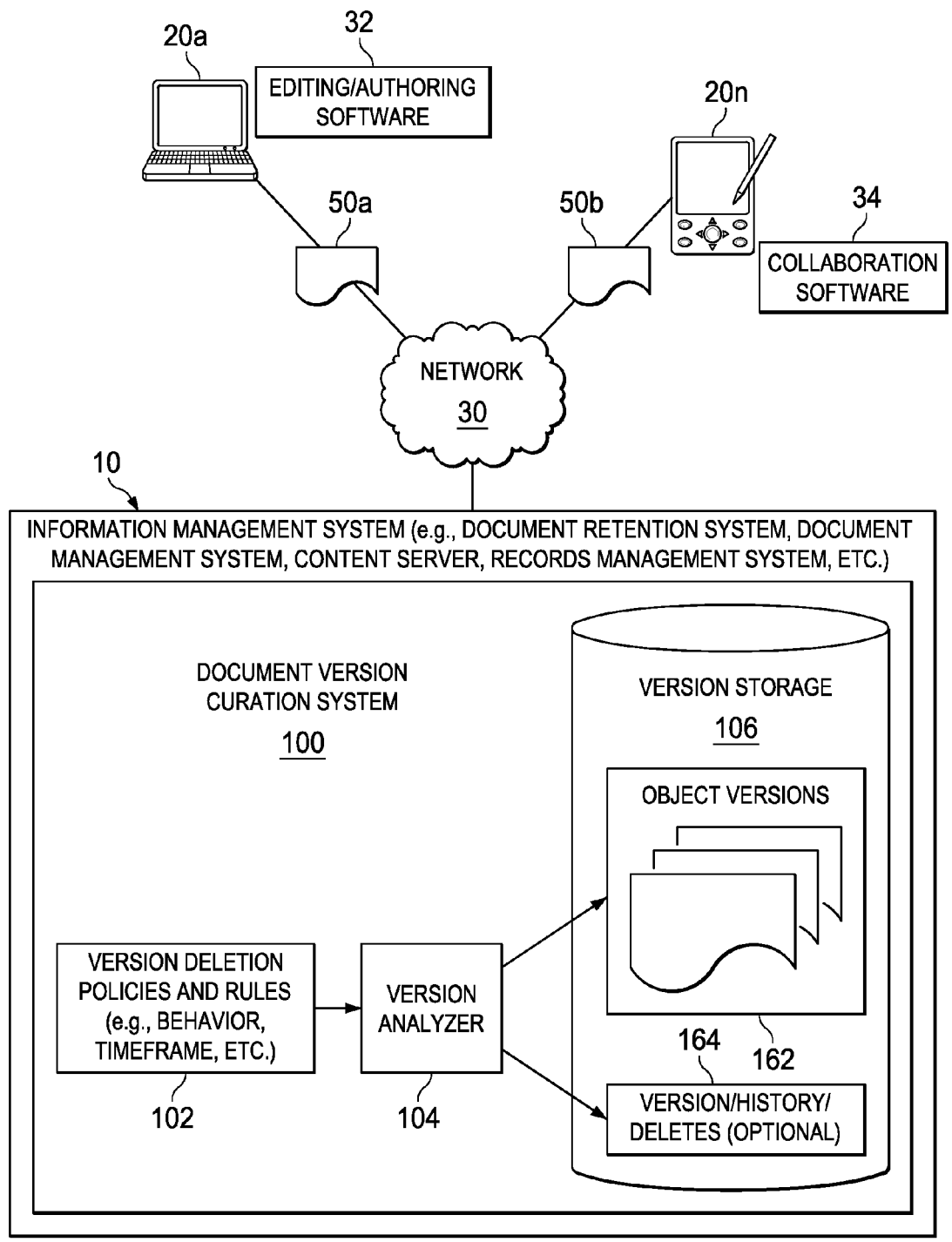
FIG. 1 depicts a diagrammatic representation of one embodiment of a document version curation system.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

The description herein regularly refers to documents and document versions. In practice, embodiments apply to any type of digital information that may be stored, and the term "document" is used as a convenience. Where "documents" are referenced, it should be understood that any type of stored and managed information may be processed by the invention, including but not limited to: office productivity software such as text editors, spreadsheets and slide presentations; publishing formats such as Adobe PDF; computer aided design and drafting files; scanned images; photographs; digital audio information; digital video information; computer output report, log files or print files; web pages; computer software source code; or other data that may be stored on digital media.

Some embodiments implement a process for selecting versions of documents to delete and retain based on a number of policies, or rules. The overall result is a reduction in the number of versions of documents stored. The number of versions removed and the savings in storage are particularly pronounced where documents are changed rapidly, or frequently, or the document is retained for a period of multiple years.

A benefit of embodiments disclosed herein relates to the reduction in the cost of saving versions of documents while preserving most of the benefits of keeping older versions of documents. Some embodiments may be incorporated within a larger application, such as programs that perform document retention, document management, records management, or archival. Indeed, embodiments disclosed herein can be applied to any system in which multiple versions or threads of conversation commentary may be provided, such as email threads, blog or other comment threads, etc.

One example embodiment of a document version curation system is illustrated in FIG. 1. In the example shown in FIG. 1, document version curation system 100 is a component of a larger system such as information management system 10. Those skilled in the art will appreciate that document version curation system 100 may also be implemented as part of a document retention system, document management system, content server, records management system, etc.

In the embodiment illustrated, document version curation system 100 includes version deletion or curation policies 102 which govern how versions of documents are to be culled or deleted from version storage 106. In this example, the control logic is realized in version analyzer 104, which is embodied on a non-transitory computer readable medium storing instructions translatable by at least one processor to perform various functions, including determining if, what, and how a curation policy or policies 102 is/are to be applied. Version analyzer 104 can examine the versions of the documents in version storage 106, and apply appropriate curation policies 102 to selectively delete certain versions of the document from version storage 106.

Document version curation system 100 may obtain/receive curation policies 102 in many ways. For example, curation policies 102 may be stored in one or more configuration files; they may be stored in a database; they may be provided by means of a programming interface; or an application that stores versions of documents may have default curation policies. It is noted, too, that documents of different types or different classifications may have different version retention rules applied thereto.

Often, document versions are added to version storage 106 by a larger application of which the invention may be part. For example, a document management system may have mechanisms for creating versions of documents and adding them to version storage 106. Examples of applications that may cause creation and/or storage of versions of a document may include editing software, authoring software, collaboration software, etc. For example, an author may create an original version 50a of a document using editing/authoring software 32 running on client device 20a and a collaborator may modify the original document using collaboration software 34 running on client device 20n, resulting in version 50b of the document being communicated to information management system 10 over network 30 and stored in version storage 106.

In this case, all versions of the documents managed by information management system 10 are stored on version storage 106. There are many ways to store these files, including a database; hard disks; network storage systems; tape; flash memory systems and so forth. These may be used alone or in combinations, both connected or offline.

Document version curation system 100 may include a system for tracking which versions of a document exist along with some descriptive information such as the version number or date the version was created. In the example embodiment illustrated in FIG. 1, the information about the version may be included in version storage 106. In practice, this metadata about files is usually stored in a database (e.g., database 164), or is part of a larger system such as a document management system or records management system (e.g., information management system 10).

Figure 2:
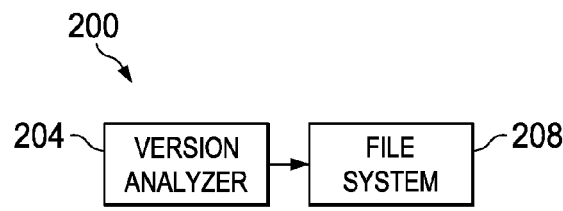
FIG. 2 depicts a diagrammatic representation of one embodiment of a document version curation system.

In some implementations, a document version curation system disclosed herein can be a distinct and separate entity. FIG. 2 depicts a diagrammatic representation of one embodiment of document version curation system 200 as a distinct and separate entity. Another example embodiment is illustrated in FIG. 2. In this example, version analyzer 204 may be implemented as a standalone application embodied on a non-transitory computer readable medium and configured for providing version control for file system 208 where document versions are stored.

As will be described in greater detail below, the curation policies of embodiments are very different from those used in records management. Records management focuses not on versions, but on the age of documents, business rules, or legal requirements, removing older items that meet their criteria. In contrast, the described curation policies define various rules and policies for removal of versions based, e.g., on factors such as importance, degree of changes, and the like.

Figure 3A:
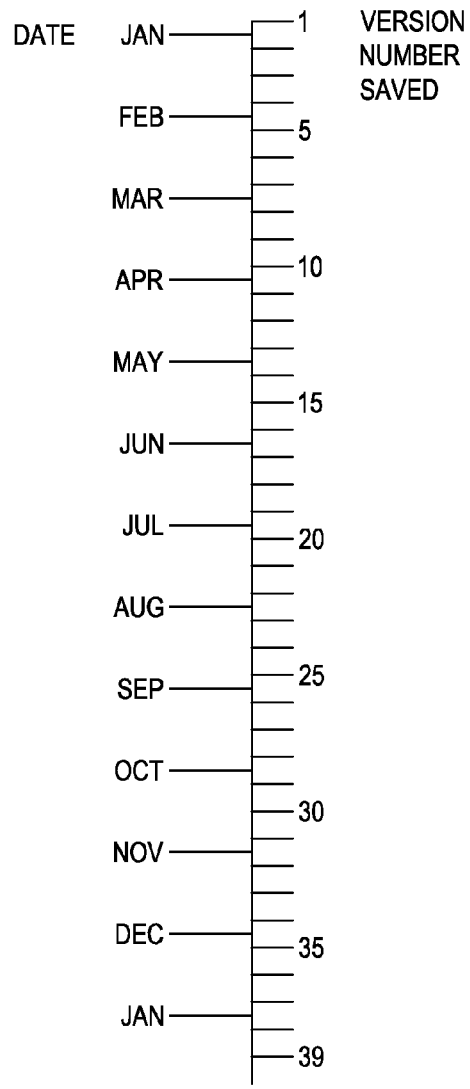
FIG. 3A and FIG. 3B illustrate exemplary document curation retention timelines.
Figure 3B:
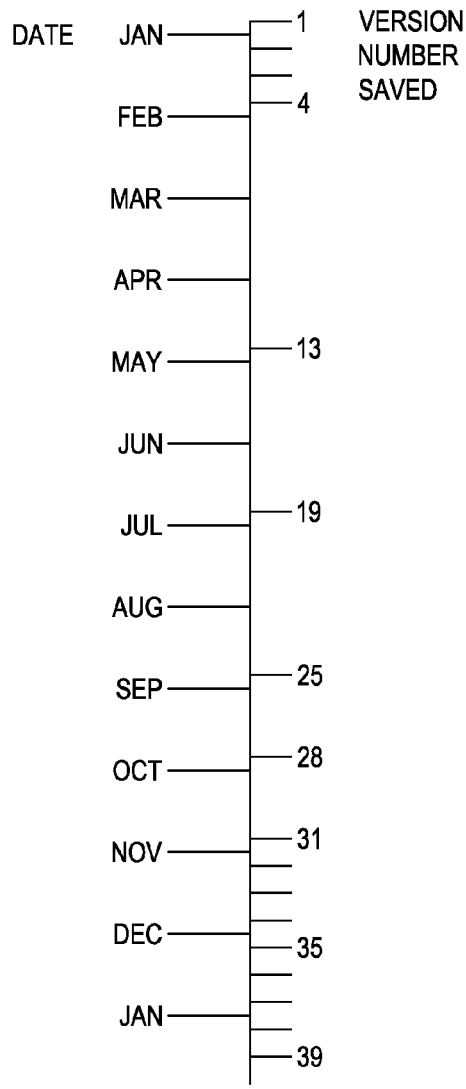

FIG. 3A and FIG. 3B illustrate exemplary document curation retention timelines. Specifically, FIG. 3A represents a view of a version history of a document. In FIG. 3A, three new versions of a document are created every month on a regular basis. The time lapsed is on the left of the vertical line, and the version number of the last version created is shown on the right of the line. In this example, 36 versions of the document are created every year. In the 13 month period illustrated, 39 versions of the document have been created, and all 39 versions have been retained. FIG. 3A illustrates a typical scenario that might exist prior to applying the invention.

FIG. 3B illustrates an alternative retention scheme for a document with versions created using the same constant rate—three new versions every month. FIG. 3B shows the versions of the document that have been retained at the time that version 39 of the document is created. As seen in FIG. 3B, the retained versions tend to cluster near the beginning of the document lifecycle, near the current version, and become increasingly sparse at points in between.

These illustrations are diagrammatic representations. In an actual application, new versions of documents are usually not regularly spaced. Frequencies may vary, and a document version curation system should accommodate new versions that could potentially be added less than a second apart.

As a non-limiting example, a set of curation policies is illustrated in FIG. 4. These curation policies may be used by embodiments of a version analyzer disclosed herein:

Active Aging Policy: Rules for the retaining the most recent versions of documents that are actively being changed can be defined. For example, the last 10 versions of a document may be kept while an object is actively edited. After a configurable period of time after the last version is created, the status would change to not be considered "active", and other Policy rules might apply. This feature allows authors of documents to undo errors or recover from data corruption for a period of time. The time period in which the Active Policy rules apply may overlap other policy ranges.

Daily Aging Policy: For a period of days that can be defined, a specified number of versions of the document can be retained for the day. Other versions are deleted. For documents that are changing rapidly in a period of days or weeks, it is useful to have these versions for reference, without keeping every single intermediate version.

Weekly Aging Policy: For a period of weeks that can be defined, one version of the document should be kept, and others discarded. The Weekly Policy rule will select from versions that have survived culling by the Daily Policy. Although labeled the "weekly" policy, this may be aligned to days of a month.

Monthly Aging Policy: For a period of months that can be defined, one version of the document should be kept, and others discarded. The Monthly Policy will select from versions that have survived culling by the Weekly Policy. The desired number of versions may be less than 1 per month. For example, one version may be retained per 10 week period.

Yearly Aging Policy: For a period of years, the number of versions per year to be retained may be specified. These will be selected from the document versions that survive Monthly Policy culling. It is common for the Yearly Policy to endure forever.

Initial Creation Policy: When a document is first created, you can specify the number of original versions to be retained and exempt from culling.

Daily Creation Policy: When a document is created, you can specify how many versions per day for how many days it should be retained, exempt from culling by Aging Policies.

Weekly Creation Policy: When a document is created, you can specify how many versions per week for how many weeks should be retained, exempt from culling by Aging Policies.

The policies described here are representative of a typical implementation. In practice, an application that implements the invention may choose the names, number of intervals and sizes of intervals to be used. It is the concept of culling intermediate versions based on policies that is more important than the specific policies defined.

It is also expected that a typical implementation of the invention will allow these parameters to be configurable, allowing the owner of the invention to optimize the behavior to best meet their needs.

When a document version curation policy for culling is applied, a version analyzer may select the versions to keep, and the versions to delete. There are many possible ways to perform such a selective culling, and the choice will depend on factors such as appropriateness to the application or implementation. Some of the alternatives for discriminating between versions to keep or versions to discard include, but are not limited to:

Closest Prior Version: This method includes determining the nominal time at which a retained version should be kept, and selecting the most recent version prior to this time. For example, say that a Policy rule is configured to keep one version per month, and the $15^{th}$ day of the month is the nominal target date. Identify the last version of the document before this date to preserve, and delete all other versions that were created in the month of interest. Note that the closest prior version might not be in the current month, in which event no versions from the current month are retained. Similarly, choosing a nearest instead of prior version is possible.

Largest Change: In a Policy period, a rule might be established that the version which contains the most significant changes should be kept. The determination of significance may be based on the size of the file, or analysis of the document to characterize the nature and scope of changes. The method of performing this analysis is outside the scope of this invention.

Change Clustering: In a Policy period, a rule might be established that the last version of the document within a cluster or grouping of new document versions should be retained. For instance, if there are 5 new versions of a document today, then no changes, then 3 new versions of the document 4 days from now, then the final version of each set of changes would be retained, since they are likely the most valuable versions. Various statistical or logical methods may be used to define a cluster, the specific implementation is outside the scope of the invention.

Combinations and variations of these methods may be used in discriminating between versions of a document to retain or delete, or other methods employed. For example, a modified implementation might choose the Closest Prior Version, but then check to see if that version appears to be within a cluster of new document versions, and select the last version of the cluster to retain.

In one embodiment, the application of document version curation policy rules during the active period when new versions are being created (including the Initial period when the first versions are created) may deserve special consideration. It is possible that many versions of documents may be created very quickly, possibly many within a few seconds. Document version curation policy rules during these periods in particular may need to be adaptive, selecting versions to discard every few seconds or minutes. Further, document version curation policies in these time frames may need to resolve to smaller time intervals, depending on the nature of the application.

Statistically, most or all versions of documents that have been newly generated or initially created are retained. Over longer periods, a version analyzer may more aggressively remove interim versions, resulting in a generally U-shaped distribution curve.

Figure 5A:
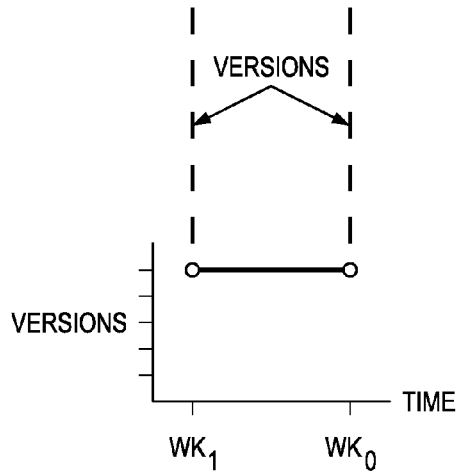
FIGS. 5A-5E depict plot diagrams illustrating one example of how progression of saved versions by time and policy application according to one embodiment may result in a generally U-shaped distribution curve.
Figure 5B:
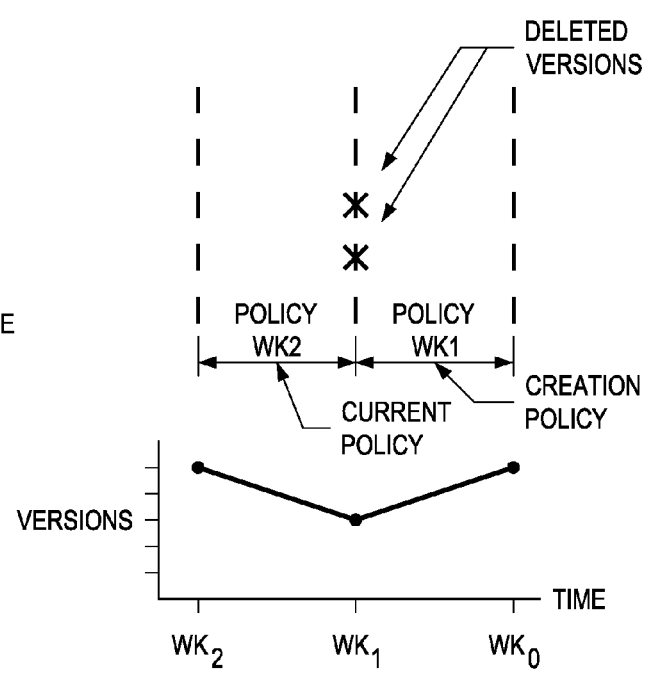
Figure 5C:
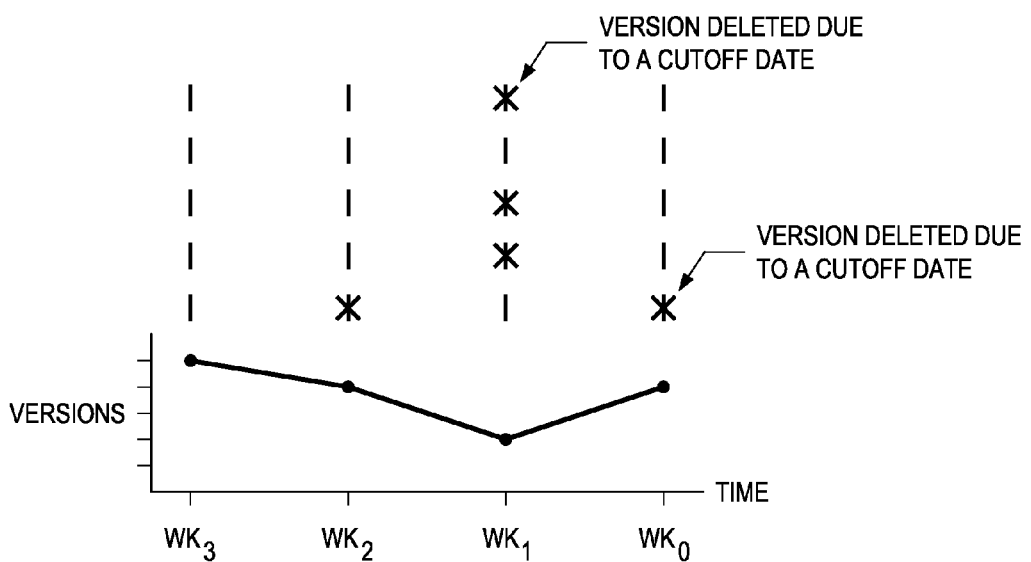
Figure 5D:
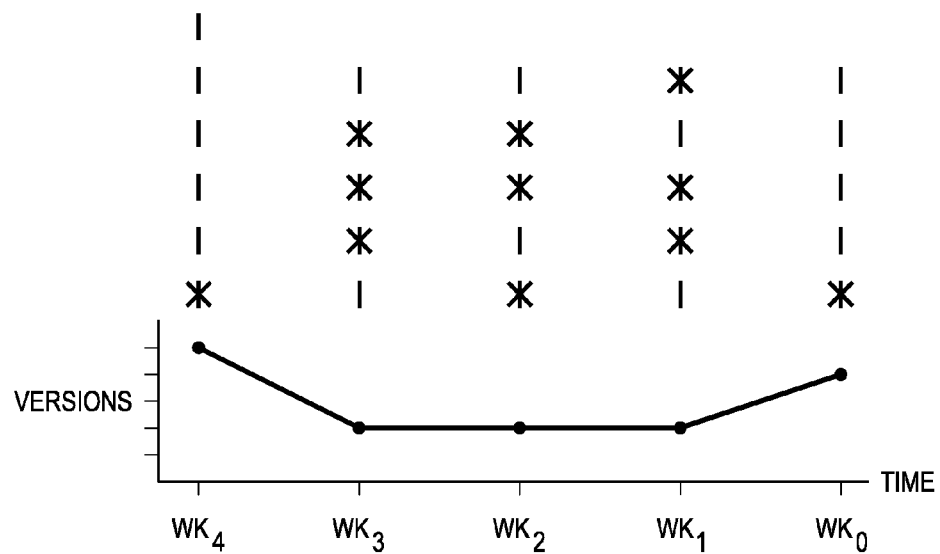
Figure 5E:
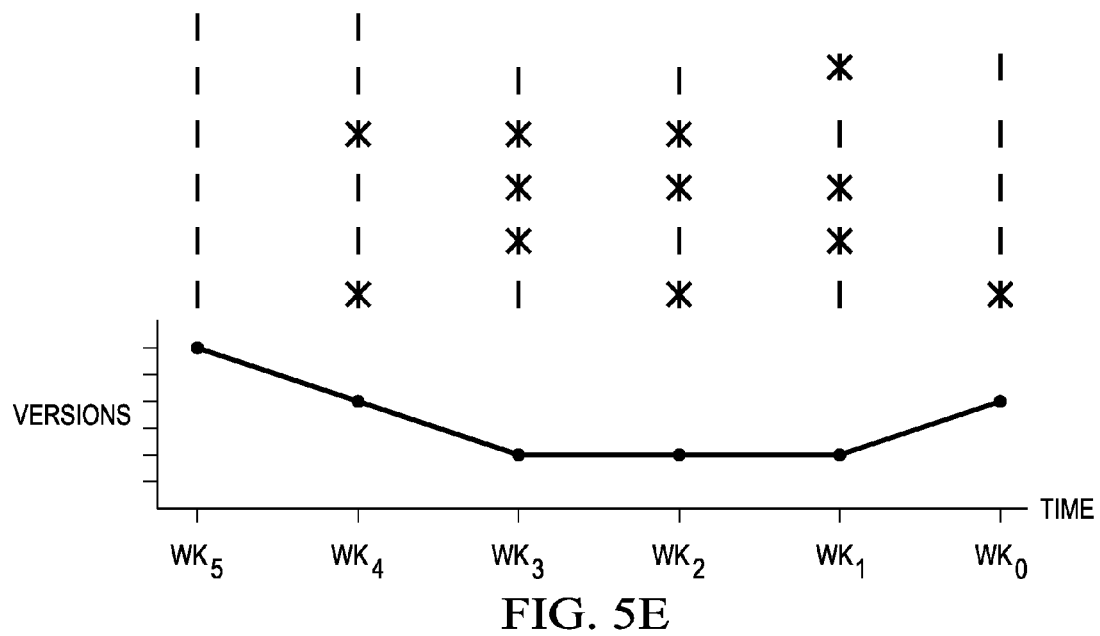

FIGS. 5A-5E depict plot diagrams illustrating one example of how progression of saved versions by time and policy application according to one embodiment may result in a generally U-shaped distribution curve which shows the number of document versions saved over time. FIG. 5A shows versions of a document created within a first timeframe and versions of the document created at a later time. If no document version curation policy applies, all versions of the document are retained. FIG. 5B shows a plurality of versions of the document created in three different timeframes. A portion of the plurality of versions is retained per a creation policy (week 0). Another portion of the plurality of versions is retained per a current policy (week 2). However, some versions created (week 1) between these two timeframes were deleted according to one or more document version curation policies, resulting in a generally V-shaped distribution curve. In some cases, a cutoff date may be used to delete versions of the document created prior to, by, or on a cutoff date, even if the cutoff date occurs within and/or close to an initial origin timeframe, close to the creation of the original version. This is illustrated in FIG. 5C. As illustrated in FIGS. 5D and 5E, while all or substantially all versions created at or close to the original creation time and all or substantially all versions created most recently are retained, less and less interim versions are retained as time progresses, resulting in a generally U-shaped distribution curve.

Note that these are example distribution curves only. As noted above, the configuration settings may cause the curve to look notably different. FIGS. 6 and 7 depict plot diagrams illustrating exemplary distributions of percentage distribution of retained versions versus time. The plot diagrams shown in FIGS. 6 and 7 may be viewed statistically across a sample of many documents, since the particular version creation times and frequency for a given document will vary. FIG. 6 illustrates two points. One is the value it provides in terms of reduced storage requirements. The other is that there are other mechanisms for implementing curation policies that will achieve this type of statistical distribution of document retention as discussed below. If the period of time that reflects creation is close to the current time, then the aggressive removal of interim versions over longer periods will not have occurred, and a distribution curve may look more like what is shown in FIG. 7.

The curation policies described so far presume that document versions are culled from a data storage (e.g., version storage 106 shown in FIG. 1) based upon rules driven by time intervals. However, this is not the only mechanism possible. One alternative is to formulate curation polices that are based on the amount of storage space required.

For example, the curation policy may stipulate that the amount of storage that may be used is limited to a certain value. The decision to cull documents is therefore based upon the amount of storage in use. The principles of distribution of saved versions would remain, but the numbers retained would be adjusted based on storage rules. The implementation that computes which versions to keep should be designed to follow similar distribution principles, adjusted to be more or less aggressive depending on the settings. Note that for storage-based policies, the sum total of storage of many documents may be used to determine how aggressive document version culling should be, since the size of a particular document may be significantly above or below the average size for that type of document.

Another variation of curation policies that may be applied relate to the number of versions. In this variation, the configuration of the system may stipulate that no more than 50 versions of a single document should be retained. As more versions of a document are added, versions are culled if necessary to keep within the specified limit for the number of versions. The same principles of retaining or deleting the versions based on configuration settings to roughly follow the statistical distributions seen in FIGS. 6 and 7 would apply.

Figure 8:
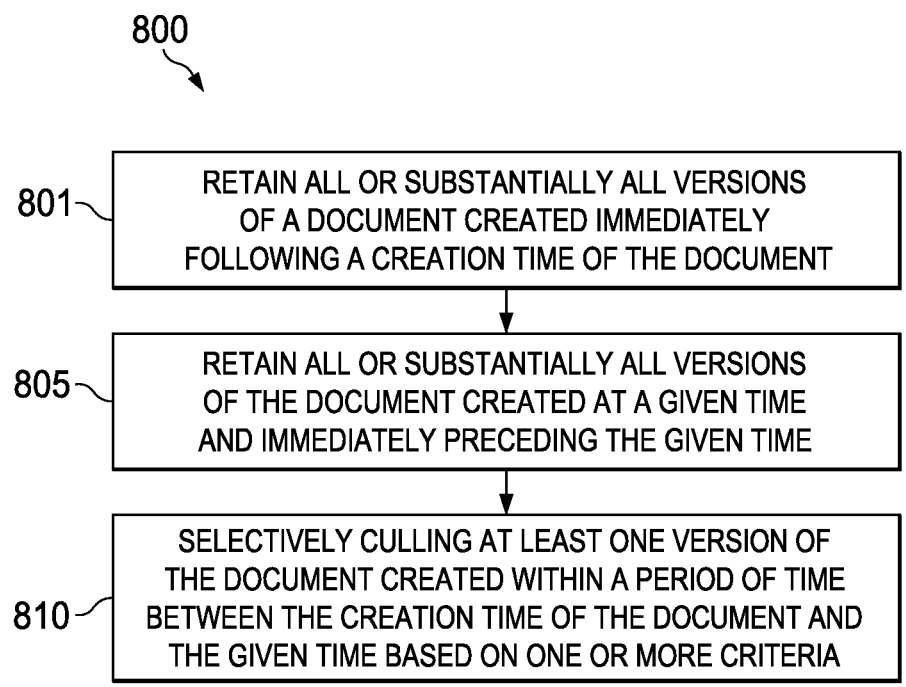
FIG. 8 depicts a diagrammatic representation of one embodiment of a document version curation system in operation.

FIG. 8 depicts a process flow illustrating an example of a document version curation method. According to one embodiment, method 800 may include retaining, in a data storage by a version analyzer embodied on a non-transitory computer readable medium, all or substantially all versions of a document created immediately following a creation time of the document (step 801). Method 800 may further include retaining, in the data storage by the version analyzer, all or substantially all versions of the document created at a given time and immediately preceding the given time (step 805) and selectively culling, from the data storage by the version analyzer based on one or more criteria, at least one version of the document created within a period of time between the creation time of the document and the given time (step 810). The one or more criteria driving the selective culling may include policies governing one or more storage requirements, behaviors, timeframes, precedents, prioritization, or a combination thereof. As described above, a cutoff date may be used as a criterion. The selective culling or deletion may include determining, by the version analyzer, if and how a policy is to be applied, and may be performed on-demand or at a predefined schedule.

Method 800 may be implemented in many ways. For example, method 800 may implement a Closest Prior Version policy described above. Accordingly, the selective culling may include determining a nominal time at which a retained version of the document is not to be culled from the data storage, identifying a last version of the document created in a policy period prior to the nominal time, and culling from the data storage all retained versions of the document created in the policy period except the last version of the document.

As a specific example, FIG. 9 depicts a diagrammatic representation of one embodiment of a document version curation system in operation. The system may have at least one processor and a non-transitory computer readable medium storing instructions translatable by the at least one processor to perform various operations, including comparing a plurality of versions of a document in a data storage based on a plurality of document version curation policies. As shown in FIG. 9, an original version (1) of a document may be created by a first user using a first application (e.g., U1/APP1). During the initial period (e.g., an origin timeframe), multiple versions ($1_1$, $1_2$, etc.) may be created from the original version (1) by the first user and a new copy (1A) of the document and multiple versions ($1A_1$, $1A_2$, $1A_3$, etc.) thereof may be created by a second user using a second application (e.g., U2/APP2). Further, at about the creation time of the original version (1), a second version (2) of the document may be created by a third user using a third application (e.g., U3/APP3).

A first document version curation policy (e.g., a creation policy) may be executed on or otherwise applied to the versions created during the initial timeframe (which makes up a first portion of all the versions of the document). Over time (e.g., days, weeks, months, years, etc.), additional versions ($1_3$, $1_4$, $1_5$, $1A_4$, $1A_5$, $1A_6$, etc.) may continue to be created by various users in many ways. For example, FIG. 9 shows that the third user may merge two different versions ($1_4$ and 2) created by different users to create a new version (3) and continue to modify the merged version (3), resulting in a new version ($3_1$) being created at present time. A second document version curation policy (e.g., a current policy) may be executed on or otherwise applied to a different portion of the versions of the document created at or during a different time. For example, a version analyzer may operate to apply the current policy to a set of versions (e.g., versions $1_4$, $1_5$, $1A_6$, 3, and $3_1$ shown in FIG. 9) created with a recent timeframe on a daily and/or weekly basis.

The first document version curation policy may include deleting a first percentage of the first portion of the plurality of versions of the document. The second document version curation policy may include deleting a second percentage of the second portion of the plurality of versions of the document. The percentage of deletion may differ from policy to policy. For example, a percentage of deletion applicable to a third portion of the plurality of versions of the document created during a time period between the origin timeframe and the recent time frame may be greater than the first percentage of deletions for the origin timeframe and also greater than the second percentage of deletions for the recent timeframe. In the example of FIG. 9, suppose version curation policies X, Y, and Z are applicable to the document: version $1_2$ may be deleted because 33% of the versions are deleted in the origin timeframe according to policy X; version $1A_2$ may be deleted because the relative change between $1A_2$ and $1A_3$ is too small or insignificant for retaining according to policy Y; and versions $1A_4$ and $1A_5$ are deleted because of policy Z that specifies a storage policy for interim versions. As described above, deletions of the versions of the document may be tracked and used to modify one or more document version curation policies.

In some embodiments, a document version curation policy or polices may take precedence over other document version curation polices such that deletion of a subject version of the document based on a certain document version curation policy is overruled if the subject version is not to be deleted under the at least one precedential document version curation policy.

In some embodiments, document version curation policies applicable to a plurality of versions of a document may include at least one policy that is based on a storage rule related to an amount of storage to use for saving the plurality of versions of the document. In some embodiments, at least one of the document version curation policies is based on a total number of versions of the document to store. In some embodiments, at least one of the document version curation policies is based on comparing the differences between at least two versions of the document. In some embodiments, at least one of the document version curation policies is based on a semantic comparison of at least two versions of the document. Other document version curation policies are also possible and anticipated.

For example, in some embodiments, a cutoff date may be used to delete versions created before the cutoff date. In some embodiments, a group of versions of a document may be defined. The group may relate to a common document version curation policy such that executing the common document version curation policy on one version in the group may cause execution of the common document version curation policy on remaining versions in the group—they are retained or deleted as a group. In some embodiments, such a group may represent different formats of the document or platform-specific versions of the document.

Embodiments described above refer to deleting versions from a data storage (e.g., version storage 106 shown in FIG. 1). Some implementations may have capabilities for multi-tier storage. For example, network disk storage may be used for version storage 106, but a magnetic tape system which is slower and less expensive may be available. Embodiments as described may also be used to identify document versions that should be moved to less expensive storage, or to offline archived storage.

As described here, a version analyzer (e.g., version analyzer 104 shown in FIG. 1 or version analyzer 204 shown in FIG. 2) is responsible for assessing and then deleting document versions. The version analyzer can be invoked to perform this operation in many possible ways. One method is to make use of the version analyzer whenever a new version of a document is added to the system. Another is to incorporate a timer into the version analyzer, or execute the version analyzer from a timer mechanism in another application. In some example uses such as in document management, archival and records management systems, either of these approaches will work well. Other methods of triggering the version analyzer may also be possible, such as database triggers or programmatic interfaces to the version analyzer.

It should also be noted that embodiments as described do not replace existing document version retention solutions from other applications such as Records Management. For example, a records management policy might be "Delete Photographs after 7 years". These features complement the embodiments as described. From the perspective of this records management program, there are potentially fewer versions of a document to delete once the 7 year trigger is reached.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as standalone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A method, comprising:
   retaining, in a data storage by a version analyzer embodied on a non-transitory computer readable medium, all or substantially all versions of a document created immediately following a creation time of the document;
   retaining, in the data storage by the version analyzer, all or substantially all versions of the document created at a given time and immediately preceding the given time; and
   selectively culling, from the data storage by the version analyzer based on one or more criteria, at least one non-retained version of the document created within a period of time between the creation time of the document and the given time, the one or more criteria including at least one policy, the selective culling including determining, by the version analyzer, if and how the at least one policy is to be applied, the determining resulting in the at least one non-retained version of the document being selected and culled from the data storage.

2. The method according to claim 1, further comprising:
   obtaining the least one policy from a configuration file or a database.

3. The method according to claim 1, further comprising:
   receiving the least one policy from an application or through a programming interface.

4. The method according to claim 1, further comprising:
   storing in a version history database information about the at least one version of the document culled from the data storage.

5. The method according to claim 1, wherein the selective culling is performed on-demand or at a predefined schedule.

6. The method according to claim 1, wherein the selective culling further comprises:
   determining a nominal time at which a retained version of the document is not to be culled from the data storage;
   identifying a last version of the document created in a policy period prior to the nominal time; and
   culling from the data storage all retained versions of the document created in the policy period except the last version of the document.

7. The method according to claim 1, wherein the one or more criteria driving the selective culling comprise policies governing one or more storage requirements, behaviors, timeframes, precedents, prioritization, or a combination thereof.

8. A system, comprising:
   at least one processor; and
   a non-transitory computer readable medium storing instructions translatable by the at least one processor to perform:
   retaining, in a data storage, all or substantially all versions of a document created immediately following a creation time of the document;

retaining, in the data storage, all or substantially all versions of the document created at a given time and immediately preceding the given time; and selectively culling, from the data storage based on one or more criteria, at least one non-retained version of the document created within a period of time between the creation time of the document and the given time, the one or more criteria including at least one policy, the selective culling including determining if and how the at least one policy is to be applied, the determining resulting in the at least one non-retained version of the document being selected and culled from the data storage.

9. The system of claim 8, wherein the instructions are further translatable by the at least one processor to perform:
obtaining the least one policy from a configuration file or a database.

10. The system of claim 8, wherein the instructions are further translatable by the at least one processor to perform:
receiving the least one policy from an application or through a programming interface.

11. The system of claim 8, wherein the instructions are further translatable by the at least one processor to perform:
storing in a version history database information about the at least one version of the document culled from the data storage.

12. The system of claim 8, wherein the selective culling is performed on-demand or at a predefined schedule.

13. The system of claim 8, wherein the selective culling further comprises:
determining a nominal time at which a retained version of the document is not to be culled from the data storage;
identifying a last version of the document created in a policy period prior to the nominal time; and
culling from the data storage all retained versions of the document created in the policy period except the last version of the document.

14. The system of claim 8, wherein the one or more criteria driving the selective culling comprise policies governing one or more storage requirements, behaviors, timeframes, precedents, prioritization, or a combination thereof.

15. A method, comprising:
comparing, by a computer having a processor and a memory, a plurality of versions of a document in a data storage based on a plurality of document version curation policies, a first portion of the plurality of versions of the document created within a recent timeframe and a second portion of the plurality of versions of the document, different than the first portion of documents, created within an origin timeframe corresponding to creation of an original version of the document, the plurality of document version curation policies including a first document version curation policy related to the first portion of the plurality of versions of the document and a second document version curation policy related to the second portion of the plurality of versions of the document;
executing the first document version curation policy on the first portion of the versions of the document, wherein the first document version curation policy includes deleting a predetermined first percentage of the first portion of the plurality of versions of the document; and
executing the second document version curation policy on the second portion of the versions of the document, wherein the second document version curation policy includes deleting a predetermined second percentage of the second portion of the plurality of versions of the document.

16. The method according to claim 15, wherein the first document version curation policy includes deleting a first percentage of the first portion of the plurality of versions of the document and the second document version curation policy includes deleting a second percentage of the second portion of the plurality of versions of the document.

17. The method according to claim 16, further comprising:
tracking prior deletions of the versions of the document; and
modifying at least the first document version curation policy or the second document version curation policy based on the tracked prior deletions.

18. The method according to claim 16, wherein the plurality of versions of the document includes a third portion created at a third timeframe, the plurality of document version curation policies including a third document version curation policy related to deletion of a third percentage of the third portion of the plurality of versions of the document, the method further comprising:
deleting the third percentage of the third portion of the plurality of versions of the document, wherein the third percentage of deletions is greater than the first percentage of deletions and is greater than the second percentage of deletions.

19. The method according to claim 18, wherein at least one of the first document version curation policy and the second document version curation policy takes precedence over the third document version curation policy, such that deletion of a subject version of the document based on the third document version curation policy is overruled if the subject version is not to be deleted under the at least one precedential document version curation policy.

20. The method according to claim 15, wherein at least one of the first document version curation policy and the second document version curation policy is based on a storage rule related to an amount of storage to use for saving the plurality of versions of the document.

21. The method according to claim 15, wherein at least one of the first document version curation policy and the second document version curation policy is based on a total number of versions of the document to store.

22. The method according to claim 15, wherein at least one of the first document version curation policy and the second document version curation policy is based on comparing the differences between at least two versions of the document.

23. The method according to claim 15, wherein at least one of the first document version curation policy and the second document version curation policy is based on a semantic comparison of at least two versions of the document.

24. The method according to claim 15, further comprising:
deleting versions of the document created prior to a cutoff date, the cutoff date occurring within the origin timeframe.

25. The method according to claim 15, further comprising:
defining a group of versions of the document, the group related to a common document version curation policy, wherein executing the common document version curation policy on one version in the group causes execution of the common document version curation policy on remaining versions in the group.

26. The method according to claim 25, wherein the group represents different formats of the document.

27. The method according to claim 25, wherein the group represents platform-specific versions of the document.

28. A system, comprising:
at least one processor; and
a non-transitory computer readable medium storing instructions translatable by the at least one processor to perform:
comparing a plurality of versions of a document in a data storage based on a plurality of document version curation policies, a first portion of the plurality of versions of the document created within a recent timeframe and a second portion of the plurality of versions of the document, different than the first portion of documents, created within an origin timeframe corresponding to creation of an original version of the document, the plurality of document version curation policies including a first document version curation policy related to the first portion of the plurality of versions of the document and a second document version curation policy related to the second portion of the plurality of versions of the document;
executing the first document version curation policy on the first portion of the versions of the document, wherein the first document version curation policy includes deleting a predetermined first percentage of the first portion of the plurality of versions of the document; and
executing the second document version curation policy on the second portion of the versions of the document, wherein the second document version curation policy includes deleting a predetermined second percentage of the second portion of the plurality of versions of the document.

29. The system of claim 28, wherein the first document version curation policy includes deleting a first percentage of the first portion of the plurality of versions of the document and the second document version curation policy includes deleting a second percentage of the second portion of the plurality of versions of the document.

30. The system of claim 29, wherein the instructions are further translatable by the at least one processor to perform:
tracking prior deletions of the versions of the document; and
modifying at least the first document version curation policy or the second document version curation policy based on the tracked prior deletions.

31. The system of claim 29, wherein the plurality of versions of the document includes a third portion created at a third timeframe, the plurality of document version curation policies including a third document version curation policy related to deletion of a third percentage of the third portion of the plurality of versions of the document, and wherein the instructions are further translatable by the at least one processor to perform:
deleting the third percentage of the third portion of the plurality of versions of the document, wherein the third percentage of deletions is greater than the first percentage of deletions and is greater than the second percentage of deletions.

32. The system of claim 31, wherein at least one of the first document version curation policy and the second document version curation policy takes precedence over the third document version curation policy, such that deletion of a subject version of the document based on the third document version curation policy is overruled if the subject version is not to be deleted under the at least one precedential document version curation policy.

33. The system of claim 28, wherein at least one of the first document version curation policy and the second document version curation policy is based on a storage rule related to an amount of storage to use for saving the plurality of versions of the document.

34. The system of claim 28, wherein at least one of the first document version curation policy and the second document version curation policy is based on a total number of versions of the document to store.

35. The system of claim 28, wherein at least one of the first document version curation policy and the second document version curation policy is based on comparing the differences between at least two versions of the document.

36. The system of claim 28, wherein at least one of the first document version curation policy and the second document version curation policy is based on a semantic comparison of at least two versions of the document.

37. The system of claim 28, wherein the instructions are further translatable by the at least one processor to perform:
deleting versions of the document created prior to a cutoff date, the cutoff date occurring within the origin timeframe.

38. The system of claim 28, wherein the instructions are further translatable by the at least one processor to perform:
defining a group of versions of the document, the group related to a common document version curation policy, wherein executing the common document version curation policy on one version in the group causes execution of the common document version curation policy on remaining versions in the group.

39. The system of claim 28, wherein the group represents different formats of the document.

40. The system of claim 28, wherein the group represents platform-specific versions of the document.

* * * * *